June 17, 1941. H. A. KNOX 2,245,595
CONTROLLED DIFFERENTIAL STEERING MECHANISM
Filed Dec. 12, 1940
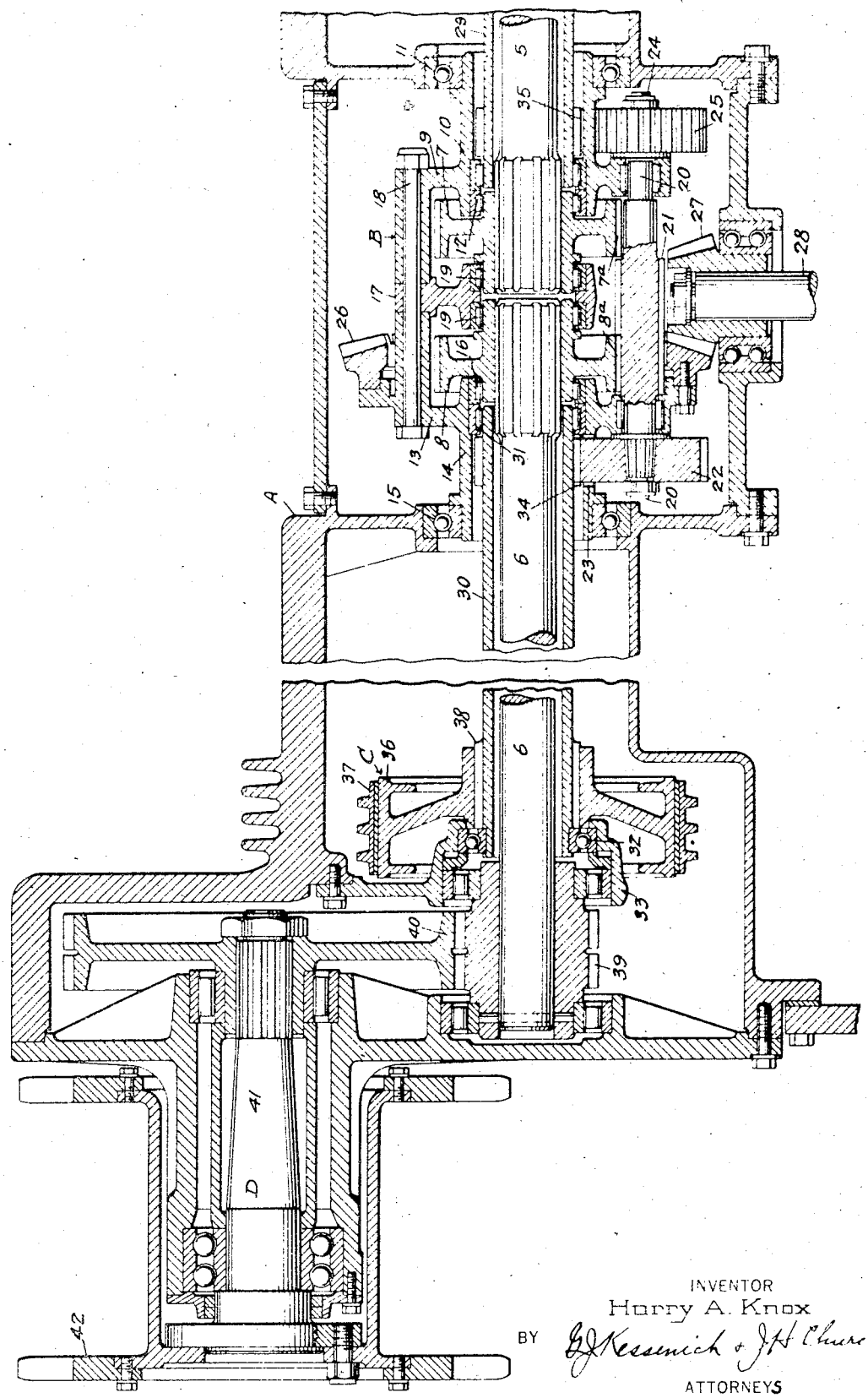
INVENTOR
Harry A. Knox
BY
ATTORNEYS Patented June 17, 1941

2,245,595

UNITED STATES PATENT OFFICE 2,245,595

CONTROLLED DIFFERENTIAL STEERING MECHANISM

Harry A. Knox, Washington, D. C.

Application December 12, 1940, Serial No. 369,831

2 Claims. (Cl. 180—9.2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a controlled differential steering mechanism for the tracks of a track-laying vehicle.

In conventional controlled differential gear units as shown in my copending application, Serial No. 353,528 it is customary to directly associate the control brakes with the differential gearing in a central carrier or casing. As a result of this arrangement there is insufficient space to provide stable bearing surfaces for the various elements and the heat generated by the gears and the brakes has been so intense that it has been necessary to provide an oil bath which is circulated through radiators for the purpose of cooling.

With these difficulties present in the differential for a medium weight vehicle, for example twenty tons, it becomes apparent that a different organization is imperative in a vehicle of fifty or more tons. The purpose of this invention is to rearrange the elements of a controlled differential unit by locating the brake control remotely with respect to the planetary gears so that all elements may have a stable mounting and overheating will be eliminated.

The specific nature of the invention as well as other objects and advantages thereof will clearly appear from a description of a preferred embodiment as shown in the accompanying drawing which is a longitudinal sectional view of a controlled differential steering mechanism.

The mechanism consists generally of a casing A which encloses a controlled differential unit B, a brake control C and a final drive unit D. A pair of coaxial drive shafts 5 and 6 mounted in the casing have their adjacent inner ends splined to the compensating gears 7 and 8 of a well known type of controlled differential.

The carrier of the unit B comprises a right plate 9 having an elongated hub 10 mounted externally on an anti-friction bearing 11 carried by the casing and internally on a bearing 12 carried by the hub of the gear 7. The left plate 13 of the carrier has an elongated hub 14 similarly mounted by external bearing 15 and internal bearing 16. A center plate 17 connected to the right plate 9 and left plate 13 by bolts 18 is mounted on a pair of bearings 19—19 on the hubs of the gears 7 and 8.

The compensating gear wheels 7 and 8 splined on the adjacent ends of shafts 5 and 6 have their teeth 7a and 8a disposed within elements forming the carrier. A planetary shaft 20 journaled in the plates 9 and 13 carries an inner drum pinion 21 meshing with the teeth 8a and an outer pinion 22 which extends through an aperture 23 in the hub 14 of the left plate 13. A planetary shaft 24 paired with the shaft 20 but reversely arranged has a similar inner drum pinion (not shown) meshing with the teeth 7a and an outer pinion 25. There are three sets of the shafts 20 and 24 but two of them are not shown.

The left plate 13 carries a bevel gear 26 driven by a pinion 27 on a power shaft 28 in the conventional manner.

A pair of sleeves 29 and 30 respectively enclosing the shafts 5 and 6 extend from the gears 7 and 8 to the outer part of the casing. The left sleeve 30 for example, has its inner end mounted in a bearing 31 carried by the hub 14 of the left plate and its outer end mounted in a bearing 32 carried by a hanger 33 fixed to the casing. The inner end of the sleeve 30 has an annular row of teeth 34 meshing with the pinion 22 while the inner end of the sleeve 29 has teeth 35 meshing with the pinion 25.

A brake drum 36 which is retarded by a brake band 37 is keyed as at 38 on the outer end of the sleeve 30. Similar structure is provided on the sleeve 29. The functioning of the brakes with the controlled differential unit is conventional.

The final drive unit D comprises a pinion 39 pinned to the shaft 6 and meshing with a gear 40 on an offset stub shaft 41 which carries a sprocket 42 for driving one of the endless tracks of the vehicle.

The casing A may be filled with oil for the purpose of cooling as is well understood in the art.

I claim:

1. In a steering mechanism, a casing, a controlled differential gear unit in the casing including a rotatable carrier having oppositely extending hubs and planetary gears disposed exteriorly of the hubs and projecting therethrough, a pair of drive shafts associated with the differential gear unit and spaced from the hubs of the carrier, a final drive unit on each drive shaft, a sleeve around each shaft having its inner end extending into and mounted in a hub of the carrier and having its outer end extending to the final drive unit, teeth on the inner end of each sleeve meshing with the planetary gears of the differential gear unit, a brake drum fixed on the outer end of each sleeve adjacent a final drive unit and disposed within the casing, and a braking member for each drum.

2. In a steering mechanism, a controlled differential gear unit including a rotatable carrier having oppositely extending hubs and planetary gears disposed exteriorly of the hubs and projecting therethrough, a pair of drive shafts associated with the differential gear unit and spaced from the hubs of the carrier, a final drive unit on each drive shaft, a sleeve around each shaft having its inner end extending into and mounted in a hub of the carrier and having its outer end extending to the final drive unit, teeth on the inner end of each sleeve disposed within a hub of the carrier and meshing with the planetary gears of the differential gear unit, a brake drum fixed on the outer end of each sleeve adjacent a final drive unit, and a braking element for each drum.

HARRY A. KNOX.